(No Model.)

H. D. MARTIN.
EYEGLASSES.

No. 424,217. Patented Mar. 25, 1890.

WITNESSES:

INVENTOR:
H. D. Martin
BY Munn & Co.
ATTORNEYS.

UNITED STATES PATENT OFFICE.

HERBERT D. MARTIN, OF PHILADELPHIA, PENNSYLVANIA.

EYEGLASSES.

SPECIFICATION forming part of Letters Patent No. 424,217, dated March 25, 1890.

Application filed June 1, 1889. Serial No. 312,385. (No model.)

*To all whom it may concern:*

Be it known that I, HERBERT D. MARTIN, of Philadelphia, in the county of Philadelphia and State of Pennsylvania, have invented a new and useful Improvement in Eyeglasses, of which the following is a full, clear, and exact description.

My invention relates to an improvement in eyeglasses, especially to an improvement upon the spring thereof, and has for its object to provide a spring capable of being worn upon the fleshy or tissue portion of the nose in contact with the latter, and which will effectually and under all conditions, when worn, retain the lenses in a proper horizontal plane.

The object of the invention is also to provide a spring which will fit comfortably upon and conform to the contour of the nose, and which will cause the bridge of the nose to sustain the major portion of the weight of the lenses.

A further object of the invention is to dispense with the unsightly spring now in general use and provide a spring of neater appearance, lighter and more economic in construction, which will hold the lenses straight before the eyes, (after the manner of spectacles,) and which, in fact, will embrace all the principles of spectacles without the unsightly bow.

Another object of the invention is to provide a spring capable of being manipulated upon a horizontal plane, and wherein, when once adjusted to the nose, it will thereafter always maintain the lenses the same distance from the eyes.

The invention consists in the combination, with the lenses or lens-frames of an eyeglass, of a spring connecting the lenses or frames, bowed forward at an angle to their horizontal axis, and in the novel construction of the spring, as will be hereinafter fully set forth, and pointed out in the claims.

Reference is to be had to the accompanying drawings, forming a part of this specification, in which similar figures of reference indicate corresponding parts in all the views.

Figure 1:
Figure 2:
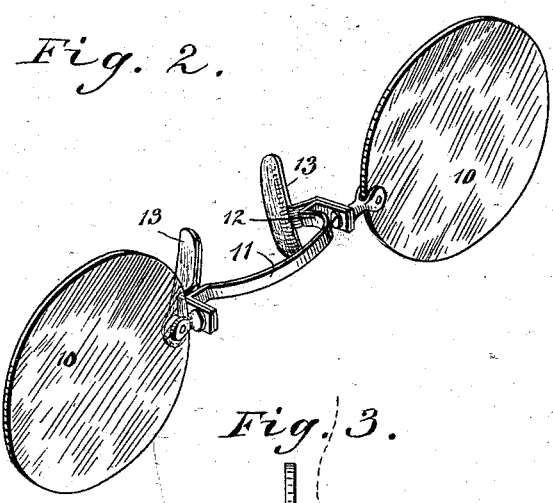
Figure 3:
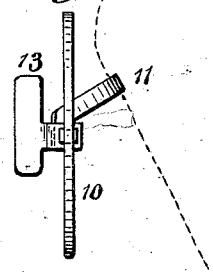

Figure 1 illustrates the application of the improved glasses. Fig. 2 is a perspective view of the glasses detached, and Fig. 3 is an end view of the same.

In eyeglasses as at present constructed the connecting-spring extends upward beyond and out of contact with the bridge of the nose, and is more or less unsightly, and the clamps or grabs are compelled to perform a dual function—namely, to support the lenses and to retain the glasses in position upon the nose.

One of the great disadvantages of the ordinary eyeglass is that the spring and clamps or grabs combined do not maintain the lenses straight before the eyes or in the same horizontal plane. The disadvantage becomes a very serious objection when cylinder-lenses are employed, as it is absolutely necessary that both lenses be kept straight before the eyes.

To overcome the above and other objections that may be urged against the present style of eyeglasses is the object of the invention, and a further object is to so improve the construction that eyeglasses may be worn with all the comfort of spectacles and without the inconvenience of the bows. This I attain by connecting the lenses 10 or lens-frames of the glasses by a bow-spring 11, which spring is given an upward and outward inclination, whereby it is at an angle to the plane of the lenses, as illustrated in Figs. 2 and 3. This spring may be constructed of any elastic material, and may also be of any desired width. The inner or bearing surface of the spring is preferably inclined to correspond with the inclination of the bridge of the wearer's nose. At each inner end of the spring an attached clamp or grab 13 of any approved style is provided, adapted to engage with the sides of the nose, as in other forms of eyeglasses. To open the spring, it is bent outward in a horizontal plane, and when so bent it is placed upon the nose, and when in position and the spring is permitted to contract it rests firmly upon the bridge of the nose, near the forehead, whereby the clamps or grabs contact with the fleshy or tissue portion of the nose. By this construction the bridge of the nose is made to sustain the weight of the lenses, and the grabs or clamps simply serve to retain the glasses upon the nose when the wearer leans forward.

It is evident that since the spring is opened in a horizontal plane only it is impossible for the lenses to sag in the least, and when once adjusted straight to the eyes they will always maintain that position when worn.

Having thus described my invention, I claim as new and desire to secure by Letters Patent—

1. Eyeglasses having an upwardly and forwardly extending spring constructed to fit and rest upon the nose of the wearer, substantially as and for the purpose specified.

2. The combination, with the lenses or lens-frames of an eyeglass, of an upwardly and forwardly extending bow-spring connecting the said lenses or frames and provided with an inclined bearing-face conforming to the inclination of the bridge of the nose, substantially as shown and described.

3. The combination, with the lenses or lens-frame, of the upwardly and forwardly extending spring 11, adapted to rest upon the nose of the wearer, and the grabs or clamps 13, secured to the ends of the spring, the said grabs or clamps being approximately parallel with the lenses, substantially as herein shown and described.

HERBERT D. MARTIN.

Witnesses:
S. E. WILSON,
C. W. BRUSH.